United States Patent
Shen et al.

(10) Patent No.: US 12,287,487 B2
(45) Date of Patent: Apr. 29, 2025

(54) AR DISPLAY APPARATUS FRAME CAPABLE OF BEING MOUNTED ON SAFETY HELMET

(71) Applicant: HANGZHOU LINGBAN TECHNOLOGY CO. LTD., Hangzhou (CN)

(72) Inventors: Qingyang Shen, Hangzhou (CN); Kai Xia, Hangzhou (CN); Wengang Wang, Hangzhou (CN)

(73) Assignee: HANGZHOU LINGBAN TECHNOLOGY CO. LTD., Hangzhou (CN)

( * ) Notice: Subject to any disclaimer, the term of this patent is extended or adjusted under 35 U.S.C. 154(b) by 0 days.

(21) Appl. No.: 18/252,626

(22) PCT Filed: Nov. 11, 2021

(86) PCT No.: PCT/CN2021/130064
§ 371 (c)(1),
(2) Date: May 11, 2023

(87) PCT Pub. No.: WO2022/105667
PCT Pub. Date: May 27, 2022

(65) Prior Publication Data
US 2024/0302666 A1    Sep. 12, 2024

(30) Foreign Application Priority Data

Nov. 18, 2020  (CN) .......................... 202022673067.5
Nov. 23, 2020  (CN) .......................... 202022725623.9

(51) Int. Cl.
*G02B 27/01*   (2006.01)
*A42B 3/04*    (2006.01)
(Continued)

(52) U.S. Cl.
CPC .......... *G02B 27/0176* (2013.01); *A42B 3/042* (2013.01); *G06F 1/163* (2013.01);
(Continued)

(58) Field of Classification Search
CPC ........ G02B 27/0176; G02B 2027/0169; A42B 3/042; G06F 1/163; G06F 3/03547; G06F 3/0362
See application file for complete search history.

(56) References Cited

U.S. PATENT DOCUMENTS 2,014,419 A * 9/1935 Voigt ...................... E04F 19/06
                                                         52/772
5,416,730 A * 5/1995 Lookofsky .............. G06F 1/163
                                                         361/679.02
(Continued)

FOREIGN PATENT DOCUMENTS

CN       108830964 A      11/2018
CN       208239543 U      12/2018
(Continued)

OTHER PUBLICATIONS

PCT/CN2021/130064- International Search Report and Written Opinion mailed on Jan. 26, 2022, 14 pages.

*Primary Examiner* — Patrick N Edouard
*Assistant Examiner* — Joseph P Fox
(74) *Attorney, Agent, or Firm* — Getech Law LLC; Jun Ye

(57) ABSTRACT

The present disclosure relates to an AR display apparatus frame capable of being mounted on a safety helmet, including a first snap-fit, a second snap-fit, a hat-brim snap-fit, and a support frame, where the first snap-fit and the second snap-fit are symmetrically disposed on a side part of the support frame, the hat-brim snap-fit is disposed on a front end of the support frame, the support frame can be sleeved on the safety helmet, and the first snap-fit, the second (Continued)

snap-fit, and the hat-brim snap-fit are capable of fixedly connecting the safety helmet to the support frame. In the present disclosure, a worker can conveniently call for help in a timely manner while a fastening manner is simple and quick.

9 Claims, 5 Drawing Sheets

(51) Int. Cl.
    *G06F 1/16*     (2006.01)
    *G06F 3/0354*     (2013.01)
    *G06F 3/0362*     (2013.01)

(52) U.S. Cl.
    CPC ........ *G06F 3/03547* (2013.01); *G06F 3/0362* (2013.01); *G02B 2027/0169* (2013.01)

(56) References Cited

U.S. PATENT DOCUMENTS

| | | |
|---|---|---|
| 2017/0011602 A1* | 1/2017 | Brav .................. H04W 4/80 |
| 2018/0164849 A1* | 6/2018 | Chan .................. A42B 3/042 |
| 2019/0297421 A1 | 9/2019 | Beltran et al. |

FOREIGN PATENT DOCUMENTS

| | | |
|---|---|---|
| CN | 112244410 A | 1/2021 |
| CN | 213210875 U | 5/2021 |
| CN | 213549988 U | 6/2021 |

\* cited by examiner

AR DISPLAY APPARATUS FRAME CAPABLE OF BEING MOUNTED ON SAFETY HELMET

TECHNICAL FIELD

The present disclosure relates to the field of augmented reality technologies, and in particular, to an AR display apparatus frame capable of being mounted on a safety helmet.

BACKGROUND

At present, much conventional operation and maintenance needs manual on-site inspection, and a maintenance solution can be proposed only by knowing a fault on the site. However, a paper record is used in a maintenance process, data correlation is poor, and it is not easy to perform statistics collection and analysis. In addition, a quantity of experts for investigation is limited, and on-site assistance cannot be well provided. Consequently, a device risk cannot be eliminated in a timely manner. Therefore, to enable the expert to better provide on-site assistance for maintenance personnel to eliminate the device risk in a timely manner, the maintenance personnel usually need to wear an AR display apparatus on the basis of a safety helmet. However, a conventional AR display apparatus conflicts with wearing of the safety helmet, and often causes work inconvenience to a maintenance worker. In addition, in a process in which the worker uses the AR display apparatus, due to an environmental factor, a conventional interaction means is inconvenient for the worker to operate. In addition, in case of emergency, the worker cannot call for help in a timely manner.

SUMMARY

An objective of the present disclosure is to provide an AR display apparatus frame capable of being mounted on a safety helmet, so that a worker conveniently calls for help in a timely manner while a fastening manner is simple and quick.

The objective of the present disclosure is implemented by using the following technical solutions. An AR display apparatus frame capable of being mounted on a safety helmet proposed in the present disclosure, including a first snap-fit, a second snap-fit, a hat-brim snap-fit, and a support frame, where the first snap-fit and the second snap-fit are symmetrically disposed on an inner side part of the support frame, the hat-brim snap-fit is disposed on a front end of the support frame, the support frame is sleeved on the safety helmet, and the first snap-fit, the second snap-fit, and the hat-brim snap-fit are capable of fixedly connecting the safety helmet to the support frame.

The objective of the present disclosure may be further implemented by using the following technical measures.

In some embodiments, the first snap-fit has a same structure as the second snap-fit, the first snap-fit includes an insertion member and a snap-in member, the insertion member is inserted into a hole disposed on the safety helmet, a groove is disposed on the support frame, and the snap-in member snaps in the groove disposed on the support frame.

In some embodiments, the snap-in member includes two symmetrically disposed convex parts, the groove includes two symmetrically disposed concave parts, and the convex parts fit with the concave parts.

In some embodiments, the hat-brim snap-fit includes a flat part, a slope part, and an "L" shaped part, two concave holes are symmetrically disposed on the flat part, the concave holes fit with protrusions on the support frame, the middle part of the hat-brim snap-fit is the slope part, the bottom part of the hat-brim snap-fit is the "L" shaped part, and the "L" shaped part is clamped with a hat brim of the safety helmet.

In some embodiments, the AR display apparatus frame further includes a self-locking rotating shaft, and the self-locking rotating shaft is disposed on the front end of the support frame, and is configured to connect a display module of an AR display apparatus.

In some embodiments, the AR display apparatus frame further includes a knob apparatus disposed on the AR display apparatus frame, the knob apparatus includes a sensing knob, an adjustment member, and a touchpad, the sensing knob is fixedly connected to the adjustment member, and is electrically connected to the touchpad, the adjustment member abuts against the touchpad, and the touchpad is electrically connected to a processing module on the AR display apparatus.

In some embodiments, the sensing knob has a conductive wire and a button piece, the touchpad has a sensor capable of sensing a clockwise direction, a counterclockwise rotation direction, or a tap operation, one end of the conductive wire is connected to the sensing knob, and the other end thereof is connected to the sensor.

In some embodiments, an outer surface of the sensing knob has corrugated protrusions disposed at equal intervals.

In some embodiments, the knob apparatus further includes a rescue button, and the rescue button is electrically connected to the touchpad.

In some embodiments, the adjustment member includes a rotating shaft, an adjustment shaft, a universal coupling, and a communicating pipe, two ends of the universal coupling are respectively connected to the rotating shaft and the communicating pipe, the communicating pipe is connected to the adjustment shaft, the adjustment shaft abuts against the touchpad, the universal coupling includes an input shaft, an output shaft, and a forked joint, the input shaft is connected to the rotating shaft, the output shaft is connected to the communicating pipe, and two ends of the forked joint are respectively connected to the input shaft and the output shaft.

The beneficial effects of the present disclosure at least include:
1. It can be ensured that the AR display apparatus is firmly and reliably fastened on the safety helmet of an operator. In addition, a fastening manner is simple and quick, and it is also convenient to disassemble the AR display apparatus from the safety helmet. Moreover, safety helmets of different brands and models and different sizes can be adapted by replacing a snap-fit.
2. The AR display apparatus frame capable of being mounted on a safety helmet further includes the self-locking rotating shaft. The self-locking rotating shaft may enable the display module of the AR display apparatus to be flipped based on manual setting of a user, and to be self-locked within a specific angle range, so as to facilitate operations of the user.
3. The sensing knob is fixedly connected to the adjustment member, and is electrically connected to the touchpad. The adjustment member abuts against the touchpad, and the touchpad is electrically connected to the processing module on the AR display apparatus. When the AR display apparatus is in a power-on state, the sensing knob is rotated leftward to enable an interface icon or file to be forward and upward, the sensing knob is rotated rightward to enable an interface icon or file to be backward and downward, and the sensing knob is tapped to execute entry, so as to select and confirm the interface application and file, improve interaction efficiency of an industrial user, and optimize interaction experience.

4. Compared with a manner of implementing touch by using the rotating shaft alone, in the present disclosure, a flexible connection of the forked joint can form a specific angle between the rotating shaft and the touchpad, to improve flexibility of a connection part between the sensing knob and the touchpad, and increase service life of the connection part. In addition, the adjustment shaft is driven to rotate through deflection rotation of the forked joint by using the rotating shaft. This can implement angle compensation between the rotating shaft and the adjustment shaft, and reduce processing precision and mounting precision requirements of the adjustment shaft and the rotating shaft.

The foregoing descriptions are only an overview of the technical solutions of the present disclosure. To help understand the technical means of the present disclosure more clearly for implementation based on the content of this specification, and to make the foregoing and other objectives, features, and advantages of the present disclosure clearer and more comprehensible, preferred embodiments are especially taken as examples in conjunction with the accompanying drawings below, and detailed descriptions are as follows.

BRIEF DESCRIPTION OF THE ACCOMPANYING DRAWINGS

DESCRIPTION OF EMBODIMENTS

To further describe the technical means and effects used in the present disclosure to achieve the intended objectives of the present disclosure, with reference to the accompanying drawings and preferred embodiments, the following describes in detail the specific implementations, structures, characteristics, and effects of an AR display apparatus frame capable of being mounted on a safety helmet proposed according to the present disclosure. Details are as follows.

In one or more embodiments, an augmented reality (AR) display apparatus can superimpose virtual information on the real world, so that a real world picture and a virtual picture can be superimposed together, thereby implementing mutual complement of the two types of information. In one or more embodiments, the AR display apparatus includes head-mounted devices such as AR glasses, an AR headband, an AR helmet, MR glasses, an MR headband, and an MR helmet. The AR display device generally includes components such as a frame, a display module, a processing module, and a battery module.

Figure 1:
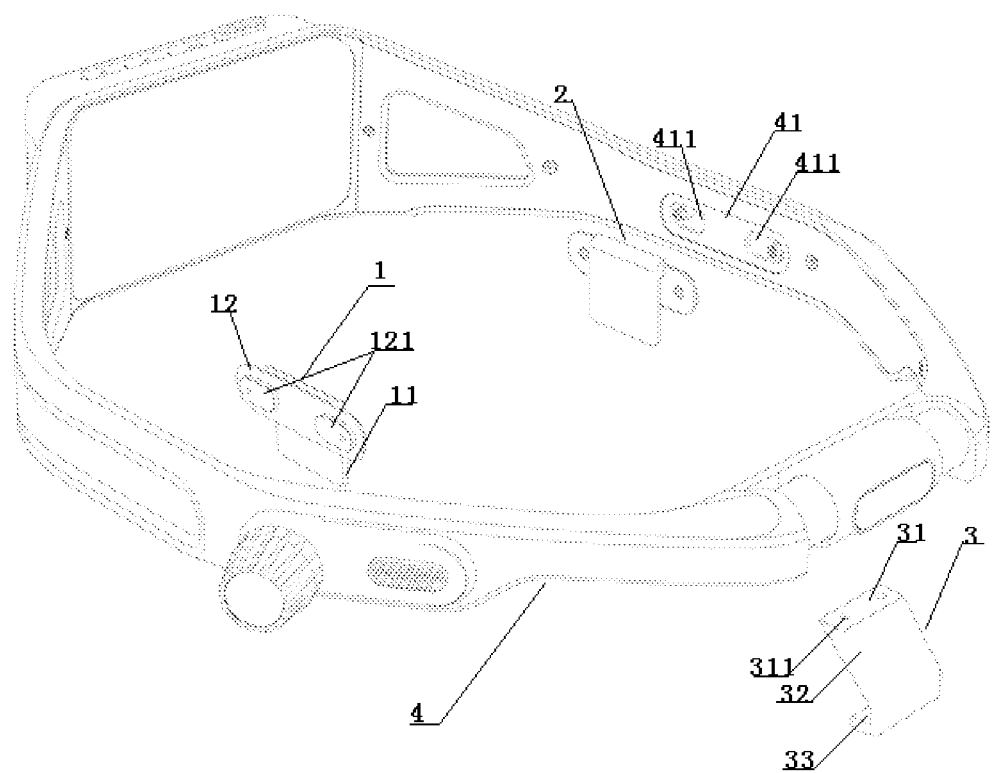
FIG. 1 is a schematic diagram of an AR display apparatus frame capable of being mounted on a safety helmet according to an embodiment of the present disclosure.
Figure 2:
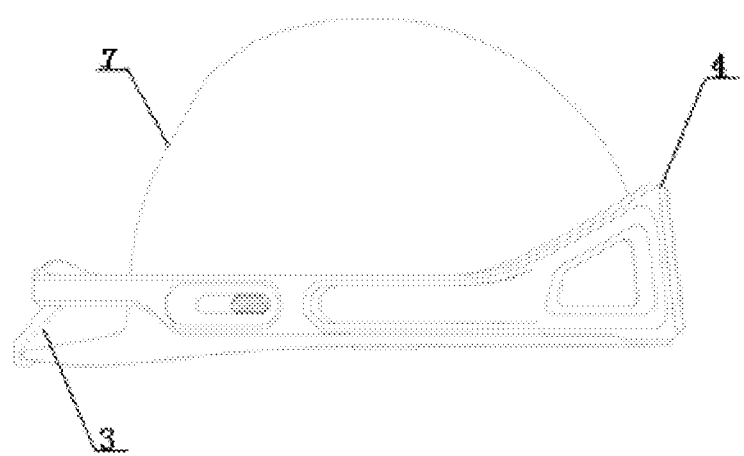
FIG. 2 is a schematic diagram of a state in which a hat-brim snap-fit is fastened to a hat brim of a safety helmet according to an embodiment of the present disclosure.

As shown in FIG. 1 and FIG. 2, an AR display apparatus frame capable of being mounted on a safety helmet in the present disclosure includes a first snap-fit 1, a second snap-fit 2, a hat-brim snap-fit 3, and a support frame 4. The support frame 4 is constructed and configured to be sleeved on a safety helmet 7. The first snap-fit 1 and the second snap-fit 2 are symmetrically disposed on an inner side part of the support frame 4. The hat-brim snap-fit 3 is disposed on a front end of the AR display apparatus frame. The first snap-fit 1, the second snap-fit 2, and the hat-brim snap-fit 3 fixedly connect the safety helmet 7 to the support frame 4. The first snap-fit 1, the second snap-fit 2, and the hat-brim snap-fit 3 all can be detachably replaced to adapt to safety helmets of different brands and/or different sizes.

Further, as shown in FIG. 1, the first snap-fit 1 has a same structure as the second snap-fit 2. The following uses the first snap-fit 1 as an example for structural description. The first snap-fit 1 includes an insertion member 11 and a snap-in member 12. The insertion member 11 is inserted into a hole (not shown in the figure) disposed on the safety helmet 7. A groove 41 is disposed on the support frame 4. After the insertion member 11 is inserted into the hole on the safety helmet 7, the snap-in member 12 snaps in the groove 41 disposed on the support frame 4.

Further, as shown in FIG. 1, the insertion member 11 is of a cuboid structure, to be inserted into the hole disposed on the safety helmet 7. The snap-in member 12 includes two symmetrically disposed convex parts 121 with shapes similar to an ellipse. The groove 41 includes two symmetrically disposed concave parts 411 with shapes similar to an ellipse. After the insertion member 11 is inserted into the hole on the safety helmet 7, the snap-in member 12 fits with the groove 41, to fasten the support frame 4 to the safety helmet 7. The convex parts 121 also fit with the concave parts 411, to further stabilize the support frame 4 with the safety helmet 7. The snap-in member 12 further includes one or more through holes, and is further fastened to the AR display apparatus by using a screw and the through hole.

Further, as shown in FIG. 1, the hat-brim snap-fit 3 includes a flat part 31, a slope part 32, and an "L" shaped part 33. The top part of the hat-brim snap-fit 3 is the flat part 31. Two concave holes 311 are symmetrically disposed on the flat part 31, and the concave holes 311 fit with protrusions (not shown in the figure) on the support frame 4. In another embodiment, two through holes 311 are symmetrically disposed on the flat part 31, and the through holes 311 are connected to concave holes (not shown in the figure) on the support frame 4 by using screws. The middle part of the hat-brim snap-fit 3 is the slope part 32, and the slope part 32 can adapt to a distance between the support frame 4 and a front end of a hat brim of the safety helmet 7. To adapt to safety helmets of different brands and models and different sizes, a length of the slope part 32 of the hat-brim snap-fit 3 may be changed. The bottom part of the hat-brim snap-fit 3 is the "L"-shaped part 33, and the "L"-shaped part 33 is clamped with the front end of the hat brim of the safety helmet 7 to fasten the support frame 4 to the hat brim of the safety helmet 7.

Figure 3:
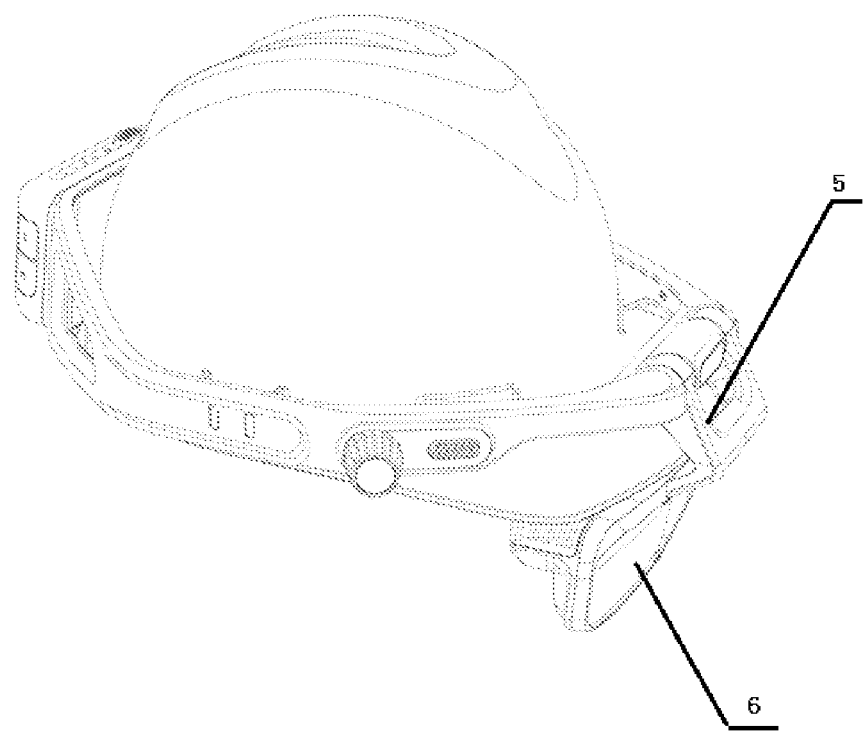
FIG. 3 is a schematic diagram of fastening an AR display apparatus frame to a safety helmet after a display module is mounted according to an embodiment of the present disclosure.

As shown in FIG. 3, the AR display apparatus frame capable of being mounted on a safety helmet in the present disclosure further includes a self-locking rotating shaft 5. The self-locking rotating shaft 5 is disposed on the front end of the AR display apparatus frame, and is configured to connect a display module 6 of the AR display apparatus. The display module of the AR display apparatus includes one or two semi-transparent semi-reflective display apparatuses, and related optical modules and circuit modules, configured to provide augmented reality information for a wearer of the AR display apparatus. The self-locking rotating shaft 5 may enable the display module of the AR display apparatus to be flipped based on manual setting of a user, and to be self-locked within a specific angle range, so as to facilitate operations of the user.

Figure 4:
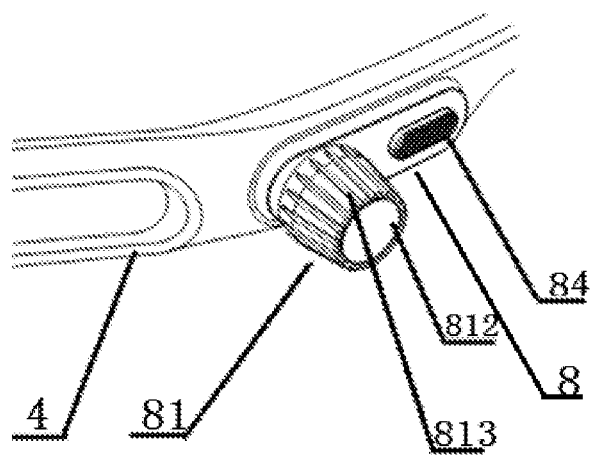
FIG. 4 is a schematic diagram of a three-dimensional structure of a knob apparatus disposed in an embodiment of the present disclosure.
Figure 5:
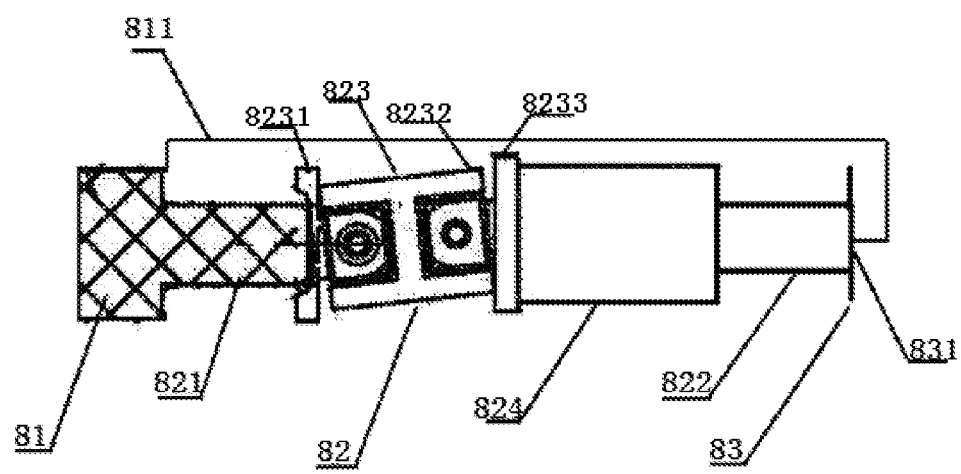
FIG. 5 is a schematic diagram of a cross-sectional structure of a knob apparatus according to an embodiment of the present disclosure.

As shown in FIG. 4 and FIG. 5, the AR display apparatus frame capable of being mounted on a safety helmet in the present disclosure further includes a knob apparatus 8 disposed on the support frame 4. In an industrial scenario, both hands of the user are generally in contact with a large quantity of objects such as dust and liquid, and a touch operation is affected. Therefore, the knob apparatus is disposed, so that a use requirement of the user of the AR display apparatus in the industrial scenario can be met. Specifically, the knob apparatus 8 may include a sensing knob 81, an adjustment member 82, and a touchpad 83. The sensing knob 81 is configured to sense a rotation direction such as a clockwise direction or a counterclockwise direction, and a tap operation of the user. The sensing knob 81 is fixedly connected to the adjustment member 82, and is electrically connected to the touchpad 83. The adjustment member 82 abuts against the touchpad 83 to implement touch. The touchpad 83 is electrically connected to a processing module on the AR display apparatus, to control an icon or a file in a display interface of the AR display apparatus.

As shown in FIG. 4 and FIG. 5, the sensing knob 81 has a conductive wire 811 and a button member 812 used for tapping. A sensor 831 is disposed on the touchpad 83. One end of the conductive wire 811 is connected to the sensing knob 81, and the other end thereof is connected to the sensor 831, to sense the rotation direction of the user and a tap operation of the user. The sensing knob 81 may be made of a conductive material, for example, metal or conductive rubber. The conductive wire 811 may be conductive rubber.

As shown in FIG. 4, an outer surface of the sensing knob 81 has corrugated protrusions 813 disposed at equal intervals. This design can facilitate operations of a worker wearing gloves.

The sensing knob 81 in the present disclosure has the conductive wire 811, the conductive wire 811 may transmit, to the sensor 831 of the touchpad 83, rotation direction information and tap information that are sensed by the sensing knob 81, the sensor 831 receives a control instruction of the user, and the touchpad 83 is electrically connected to the processing module of the AR display apparatus to control the icon or the file in the display interface of the AR display apparatus. Therefore, when the user operates the sensing knob 81, the user may rotate the sensing knob in a clockwise direction and a counterclockwise direction, or perform a tap operation, that is, may move the icon or the file in the display interface of the AR display apparatus to implement browsing or interaction. Specifically, if the sensing knob is rotated leftward, the interface icon or the file is forward and upward. If the sensing knob is rotated rightward, the interface icon or the file is backward and downward. If the sensing knob 81 is tapped, entry is executed to implement interaction.

As shown in FIG. 4, the knob apparatus 8 further includes a rescue button 84. The rescue button 84 is disposed on a same side of the knob apparatus 8, the rescue button 84 is electrically connected to the touchpad 83, and the touchpad 83 is electrically connected to the processing module, to send a wireless signal to an external command center. The rescue button 84 has a button piece (not shown in the figure). The user can tap the button piece to call for help through sound and light.

As shown in FIG. 5, the adjustment member 82 includes a rotating shaft 821, an adjustment shaft 822, a universal coupling 823, and a communicating pipe 824. Two ends of the universal coupling 823 are respectively connected to the rotating shaft 821 and the communicating pipe 824, the communicating pipe 824 is connected to the adjustment shaft 822, and the adjustment shaft 822 abuts against the touchpad 83.

As shown in FIG. 5, the universal coupling 823 includes an input shaft 8231, an output shaft 8233, and a forked joint 8232. The input shaft 8231 is connected to the rotating shaft 821, the output shaft 8233 is connected to the communicating pipe 824, and two ends of the forked joint 8232 are respectively connected to the input shaft 8231 and the output shaft 8233. Compared with a manner of implementing touch by using the rotating shaft 821 alone, in the present disclosure, a flexible connection of the forked joint 8233 can make a specific angle between the rotating shaft 821 and the touchpad 83, to improve flexibility of a connection part between the sensing knob 81 and the touchpad 83, and increase service life of the connection part. In addition, the adjustment shaft 822 is driven to rotate through deflection rotation of the forked joint 8233 by using the rotating shaft 821. This can implement angle compensation between the rotating shaft 821 and the adjustment shaft 822, and reduce processing precision and mounting precision requirements of the adjustment shaft 822 and the rotating shaft 821.

A base (not shown in the figure) is disposed at the bottom part of the touchpad 83, and the touchpad and the base are disposed in the support frame 4.

A person skilled in the art may understand that the implementations shown in FIG. 4 and FIG. 5 may be independently implemented in another type of AR display apparatus, that is, the implementations in FIG. 4 and FIG. 5 are not merely implemented in the implementations in FIG. 1 to FIG. 3. That is, in one or more embodiments of the present disclosure, an AR display apparatus is further disclosed, including a knob apparatus disposed on a frame of the AR display apparatus. The knob apparatus further includes a sensing knob, an adjustment member, and a touchpad, the sensing knob is fixedly connected to the adjustment member, and is electrically connected to the touchpad, the adjustment member abuts against the touchpad, and the touchpad is electrically connected to a processing module on the AR display apparatus.

The foregoing describes the basic principles of the present disclosure with reference to specific embodiments. However, it should be noted that advantages, effects, and the like mentioned in the present disclosure are merely examples rather than limitations, and it cannot be considered that these advantages, effects, and the like are necessary for each embodiment of the present disclosure. In addition, specific details disclosed above are merely used as examples and facilitate understanding, but impose no limitation. The foregoing details impose no limitation on the necessity of using the foregoing specific details to implement the present disclosure.

The words such as "include," "contain", and "have" in the present disclosure are inclusive words, refer to "include but not limited to," and may be used interchangeably therewith. The words "or" and "and" used herein refer to the word "and/or", and may be used interchangeably therewith unless otherwise specified in the context clearly. The word "for example" used herein refers to a phrase "for example, but not limited to", and may be used interchangeably therewith.

The foregoing descriptions of disclosed aspects are provided to enable any person skilled in the art to make or use the present disclosure. Various modifications to these aspects will be obvious to a person skilled in the art, and general principles defined herein may be applied to other aspects without departing from the scope of the present disclosure. Therefore, the present disclosure is not intended to be limited to the aspects shown herein, but is in accordance with the widest scope consistent with the principles and novel features disclosed herein.

What is claimed:

1. An augmented reality (AR) display apparatus frame capable of being mounted on a safety helmet, comprising a first snap-fit, a second snap-fit, a hat-brim snap-fit, and a support frame, wherein the first snap-fit and the second snap-fit are symmetrically disposed on an inner side part of the support frame, the hat-brim snap-fit is disposed on a front end of the support frame, the support frame is sleeved on the safety helmet, and the first snap-fit, the second snap-fit, and the hat-brim snap-fit are capable of fixedly connecting the safety helmet to the support frame, wherein the AR display apparatus frame further comprises a knob apparatus disposed on the AR display apparatus frame, the knob apparatus comprises a sensing knob, an adjustment member, and a touchpad, the sensing knob is fixedly connected to the adjustment member, and is electrically connected to the touchpad, the adjustment member abuts against the touchpad, and the touchpad is electrically connected to a processing module on the AR display apparatus.

2. The AR display apparatus frame capable of being mounted on a safety helmet according to claim 1, wherein the first snap-fit has a same structure as the second snap-fit, the first snap-fit comprises an insertion member and a snap-in member, the insertion member is inserted into a hole disposed on the safety helmet, a groove is disposed on the support frame, and the snap-in member snaps in the groove disposed on the support frame.

3. The AR display apparatus frame capable of being mounted on a safety helmet according to claim 2, wherein the snap-in member comprises two symmetrically disposed convex parts, the groove comprises two symmetrically disposed concave parts, and the convex parts fit with the concave parts.

4. The AR display apparatus frame capable of being mounted on a safety helmet according to claim 1, wherein the hat-brim snap-fit comprises a flat part, a slope part, and an "L" shaped part, two concave holes are symmetrically disposed on the flat part, the concave holes fit with protrusions on the support frame, the middle part of the hat-brim snap-fit is the slope part, the bottom part of the hat-brim snap-fit is the "L" shaped part, and the "L" shaped part is clamped with a hat brim of the safety helmet.

5. The AR display apparatus frame capable of being mounted on a safety helmet according to claim 1, wherein the AR display apparatus frame further comprises a self-locking rotating shaft, and the self-locking rotating shaft is disposed on the front end of the support frame, and is configured to connect a display module of an AR display apparatus.

6. The AR display apparatus frame capable of being mounted on a safety helmet according to claim 1, wherein the sensing knob has a conductive wire and a button piece, the touchpad has a sensor capable of sensing a clockwise direction, a counterclockwise rotation direction, or a tap operation, one end of the conductive wire is connected to the sensing knob, and the other end thereof is connected to the sensor.

7. The AR display apparatus frame capable of being mounted on a safety helmet according to claim 1, wherein an outer surface of the sensing knob has corrugated protrusions disposed at equal intervals.

8. The AR display apparatus frame capable of being mounted on a safety helmet according to claim 1, wherein the knob apparatus further comprises a rescue button, and the rescue button is electrically connected to the touchpad.

9. The AR display apparatus frame capable of being mounted on a safety helmet according to claim 1, wherein the adjustment member comprises a rotating shaft, an adjustment shaft, a universal coupling, and a communicating pipe, two ends of the universal coupling are respectively connected to the rotating shaft and the communicating pipe, the communicating pipe is connected to the adjustment shaft, the adjustment shaft abuts against the touchpad, the universal coupling comprises an input shaft, an output shaft, and a forked joint, the input shaft is connected to the rotating shaft, the output shaft is connected to the communicating pipe, and two ends of the forked joint are respectively connected to the input shaft and the output shaft.

* * * * *